US010891959B1

(12) United States Patent
Moeller et al.

(10) Patent No.: US 10,891,959 B1
(45) Date of Patent: Jan. 12, 2021

(54) VOICE MESSAGE CAPTURING SYSTEM

(71) Applicant: Google LLC, Mountain View, CA (US)

(72) Inventors: Jonathan Brandt Moeller, Mountain View, CA (US); Jeremy Drew Payne, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 96 days.

(21) Appl. No.: 16/359,530

(22) Filed: Mar. 20, 2019

Related U.S. Application Data

(63) Continuation of application No. 15/200,148, filed on Jul. 1, 2016, now abandoned.

(51) Int. Cl.
| | |
|---|---|
| G10L 17/22 | (2013.01) |
| G10L 15/01 | (2013.01) |
| G10L 15/30 | (2013.01) |
| H04L 29/08 | (2006.01) |
| H04W 4/02 | (2018.01) |

(Continued)

(52) U.S. Cl.
CPC .............. *G10L 17/22* (2013.01); *G10L 15/01* (2013.01); *G10L 15/30* (2013.01); *H04B 17/318* (2015.01); *H04L 67/24* (2013.01); *H04W 4/023* (2013.01); *G06F 3/04842* (2013.01); *H04W 88/02* (2013.01)

(58) Field of Classification Search
CPC ......... G10L 17/22; G10L 15/01; G10L 15/30; H04B 17/318; H04L 67/24; H04W 4/023; H04W 88/02; G06F 3/04842
See application file for complete search history.

(56) References Cited

U.S. PATENT DOCUMENTS

| 5,602,963 A | 2/1997 | Bissonnette et al. |
| 6,538,623 B1 | 3/2003 | Parnian et al. |

(Continued)

FOREIGN PATENT DOCUMENTS

| CA | 2396997 | 2/2004 |
| CN | 204087805 | 1/2015 |
| EP | 1133206 | 5/2006 |

OTHER PUBLICATIONS

Yahoo Custom Voice Recordable Sound Button, Voice Recorder Button with 60s Recording for Gifts, https://www.alibaba.com/product-detail/Custom-Voice-Recordable-Sound-Button-Voice_60176284518.html?spm+a2700.7724857.29.1.Ms8q9Q&s=p; 14 pages; retrieved on May 23, 2016.

(Continued)

*Primary Examiner* — Fariba Sirjani
(74) *Attorney, Agent, or Firm* — Middleton Reutlinger (57) ABSTRACT

Systems, apparatuses, and methods for capturing voice messages are provided. In one embodiment, a method can include receiving, by one or more processors of a mobile user device, a user input indicative of a voice message at a first time. The method can further include identifying contextual data indicative of one or more computing devices within proximity of the mobile user device. The method can include providing a set of data for storage in one or more memory devices of the mobile user device. The set of data can indicate the voice message and the contextual data indicative of the computing devices. The method can further include providing an output indicative of the voice message and the contextual data to one or more secure computing devices at a second time.

20 Claims, 5 Drawing Sheets

(51) Int. Cl.
*H04B 17/318* (2015.01)
*G06F 3/0484* (2013.01)
*H04W 88/02* (2009.01)

(56) References Cited

U.S. PATENT DOCUMENTS

| | | | |
|---|---|---|---|
| 6,556,222 B1 | 4/2003 | Narayanaswami | |
| 7,289,825 B2 | 10/2007 | Fors et al. | |
| 7,769,142 B2 | 8/2010 | Selbie et al. | |
| 8,234,940 B2 | 8/2012 | Smith | |
| 8,350,681 B2 | 1/2013 | Bells | |
| 8,805,692 B2 | 8/2014 | Goldstein | |
| 8,849,202 B2 | 9/2014 | Linde et al. | |
| 8,851,372 B2 | 10/2014 | Zhou et al. | |
| 8,959,023 B2 | 2/2015 | Bringert et al. | |
| 8,965,423 B2 | 2/2015 | Srinivasan | |
| 9,098,190 B2 | 8/2015 | Zhou et al. | |
| 9,100,493 B1 | 8/2015 | Zhou et al. | |
| 9,288,836 B1 | 3/2016 | Clement et al. | |
| 10,528,012 B2 * | 1/2020 | Wang | H04M 1/72547 |
| 2004/0102962 A1 | 5/2004 | Wei | |
| 2006/0206340 A1 | 9/2006 | Silvera et al. | |
| 2006/0256959 A1 | 11/2006 | Hymes | |
| 2009/0204410 A1 | 8/2009 | Mozer et al. | |
| 2009/0210729 A1 | 8/2009 | Adams | |
| 2012/0035924 A1 | 2/2012 | Jitkoff et al. | |
| 2012/0214447 A1 * | 8/2012 | Russell | H04M 3/02 455/412.1 |
| 2012/0315876 A1 * | 12/2012 | Srinivasan | H04W 4/029 455/411 |
| 2013/0102251 A1 | 4/2013 | Linde et al. | |
| 2013/0344896 A1 | 12/2013 | Kirmse et al. | |
| 2014/0143064 A1 | 5/2014 | Tran | |
| 2014/0278444 A1 | 9/2014 | Larson et al. | |
| 2015/0163765 A1 | 6/2015 | Hobbs et al. | |
| 2015/0248833 A1 | 9/2015 | Arne et al. | |
| 2016/0042637 A1 | 2/2016 | Cahill | |
| 2016/0133254 A1 * | 5/2016 | Vogel | G06F 9/451 704/275 |
| 2016/0151603 A1 | 6/2016 | Shouldice et al. | |
| 2016/0174840 A1 | 6/2016 | Udoh et al. | |
| 2016/0241711 A1 | 8/2016 | Eilts et al. | |
| 2016/0310820 A1 | 10/2016 | Kline et al. | |
| 2017/0091837 A1 | 3/2017 | Russell et al. | |
| 2017/0185052 A1 * | 6/2017 | Wang | G04G 21/06 |
| 2017/0262136 A1 | 9/2017 | Raghavan et al. | |
| 2017/0331901 A1 | 11/2017 | Sarlandie de la Robertie et al. | |
| 2018/0139315 A1 | 5/2018 | Kalhan et al. | |
| 2018/0242101 A1 | 8/2018 | Lin et al. | |

OTHER PUBLICATIONS

Alibaba.com: Voice Reorder Button, Voice Recorder Button Suppliers and Manufacturers at Alibaba.com, http://www.alibaba.com/showroom/voice-recorder-button.html; 4 pages; retrieved on May 23, 2016.

Amazon.com: 4GB Wireless Bluetooth Mobile Cellphonc Telephone Call Voice Audio Recorder Dictaphone Mp3, https://www.amazon.com/Wireless-Bluetooth-Cellphone-Telephone-Dictaphone/dp/11007XQNR2Wie=UT8M=&s=electroffics; 6 pages; dated Jan. 1, 2016.

Cypress, CY5672 PRoClm BLE Remote Control Reference Design Kit (RDK), http://ww-w.eypress.com/documentation/development-kitsboards/cy5672-proc-ble-remote-control-referenee-design-kit-rdk; 4 pages; . retrieved on Jun. 28, 2016; dated Nov. 23, 2015.

Vincent. "Google Built a Prototype Star Trek Communicator for Voice Searches", http://www.theverge.com/2015/11/23/9782486/googie-star-trek-communicator; 3 pages; retrieved on Jun. 30, 2016.

YouTube, BlueVoice Voice Streaming Over Bluetooth Low Energy, https://www.youtube.com/watch?v=CDnxRqPwGEw; 3 pages; retrieved on Jun. 30, 2016.

* cited by examiner

FIG. 1

| MESSAGE | TIMESTAMP | CONTEXTUAL DATA |
|---|---|---|
| Message 1 | $t_1$ | Comp. Device$_1$ -- ID$_1$ -- Sig. Strength$_1$<br>Comp. Device$_2$ -- ID$_2$ -- Sig. Strength$_2$ |
| Message 2 | $t_2$ | Comp. Device$_3$ -- ID$_3$ -- Sig. Strength$_3$<br>Comp. Device$_4$ -- UUID$_4$ -- Sig. Strength$_4$ |
| Message 3 | $t_3$ | Comp. Device$_5$ -- ID$_5$ -- Sig. Strength$_5$<br>Comp. Device$_6$ -- ID$_6$ -- Sig. Strength$_6$ |
| ... | ... | ... |
| Message N | $t_N$ | Comp. Device$_N$ -- ID$_N$ -- Sig. Strength$_N$ |

FIG. 5

VOICE MESSAGE CAPTURING SYSTEM

FIELD

The present disclosure relates generally to capturing voice messages, and more particularly to systems, apparatuses, and methods for capturing voice messages from a mobile user device.

BACKGROUND

A device, such as a smartphone, tablet, desktop, etc. can receive voice commands from a user and synchronously act to meet the particulars of the voice command. For instance, a user of such a device may request directions to a restaurant. The device may receive the request and identify appropriate directions for the user to follow to the restaurant. This type of synchronous command-response scheme requires the device to have significant processing and connectivity capabilities to provide a near-immediate response.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of capturing voice messages. The method can include receiving, by one or more processors of a mobile user device, a user input indicative of a voice message at a first time. The method can further include identifying, by the one or more processors, contextual data indicative of one or more computing devices within proximity of the mobile user device at or near the first time. The contextual data can be processable to determine a location associated with the mobile user device at or near the first time. The method can include providing, by the one or more processors, a set of data for storage in one or more memory devices of the mobile user device. The set of data can indicate the voice message and the contextual data indicative of the one or more computing devices. The method can further include detecting, by the one or more processors, that the mobile user device is within a communication range with one or more secure computing devices. The method can include providing, by the one or more processors, an output indicative of the voice message and the contextual data to at least one of the secure computing devices at a second time.

Another example aspect of the present disclosure is directed to a system for capturing voice messages. The system can include one or more processors and one or more memory devices. The one or more memory devices can store instructions that when executed by the one or more processors cause the one or more processors to perform operations. The operations can include receiving a user input indicative of a voice message at a first time. The operations can include identifying contextual data indicative of one or more computing devices within proximity of the one or more processors at a time associated with the user input. The contextual data can be processable to determine a location associated with the mobile user device. The operations can include providing, for storage in one or more of the memory devices, a set of data indicating the voice message and the contextual data indicative of the one or more computing devices. The operations can further include providing an output indicative of the voice message and the contextual data to one or more secure computing devices at a second time.

Yet another example aspect of the present disclosure is directed to a mobile user device including an input device to receive a user input indicative of a voice message from a user, one or more processors, and one or more memory devices. The one or more memory devices can store instructions that when executed by the one or more processors cause the one or more processors to perform operations. The operations can include obtaining a set of data indicating an activation of the input device and receiving the user input indicative of the voice message at a first time. The operations can further include identifying contextual data indicative of one or more computing devices within proximity of the mobile user device at a time associated with receiving the user input. The contextual data can be processable to determine a location associated with the mobile user device. The operations can include providing, for storage in one or more of the memory devices, a set of data indicating the voice message and the contextual data indicative of the one or more computing devices. The operations can include detecting that the mobile user device is within a communication range with one or more secure computing devices. The operations can include providing an output indicative of the voice message and the contextual data to one or more secure computing devices at a second time.

Other example aspects of the present disclosure are directed to systems, apparatuses, tangible, non-transitory computer-readable media, user interfaces, memory devices, and electronic devices for capturing voice messages.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 2 depicts an example set of data according to example embodiments of the present disclosure;

DETAILED DESCRIPTION

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment.

Thus, it is intended that aspects of the present disclosure cover such modifications and variations.

Example aspects of the present disclosure are directed to capturing voice messages from a limited mobile user device. For instance, a mobile user device can include a light hardware infrastructure for capturing and transmitting a voice message from a user. The mobile user device can include limited processing capability, limited memory capacity, limited display capability, and/or limited communicability (e.g., less than a typical smartphone, smart watch, tablet, etc.). For instance, the mobile user device can include one or more button(s), a microphone, small processor(s), a transmitter, and a limited amount of memory. In some implementations, the device can further omit display components (e.g., a screen for displaying an interface, information, etc.). Moreover, to limit the hardware requirements, internet connectivity components can be omitted from the mobile user device to save size and/or power requirements. As such, the mobile user device can be light-weight, but without the ability to connect to an internet network. The mobile user device can be designed to be worn (e.g., as pinbutton, necklace, bracelet charm, tie clip) such that it is easily transportable and accessible for a user.

A user can initiate a voice message by, for example, activating a button of the device (e.g., via the user's finger). The mobile user device can record the voice message and store it in its memory devices along with a timestamp indicating when the voice message was recorded. The mobile user device can also collect and store metadata indicating one or more computing device(s) in the vicinity of the mobile user device when it recorded the voice message. At a future point in time, when the mobile user device detects that it is within a communication range of a secure computing device (e.g., the user's mobile phone, a secured brillo/weave device, onhub device, etc.), the mobile user device can transmit (e.g., using Bluetooth low energy protocol) the stored voice message (and the timestamp and metadata) to a secure computing device. The secured computing device can use its more robust communicability (e.g., including internet connectivity) to send the voice message to one or more server(s) (e.g., of a cloud-based server system). The server(s) can store the voice message, transcribe the voice message, and/or act on a request (e.g., "remind me of this place") indicated in the voice message. The server(s) can provide an output for display on a user interface of a display device (e.g., the user's laptop) by which the user can listen to the voice message, read the transcription, view the action taken by the servers (e.g., placing a pin on a map indicting the requested place reminder), etc. In this way, the mobile user device can leverage the more robust hardware infrastructure of the secure computing device to store and retrieve voice messages in a cloud-based server system, while remaining light and wearable for its user.

More particularly, the mobile user device can receive a user input indicative of a voice message. The user input can be an audio input spoken by a user of the mobile user device. The input can be a reminder to do something (e.g., "remind me to get eggs," "remind me of this place"), a memo (e.g., "I like walking at night"), a question (e.g., "who has played the most consecutive MLB baseball games?"), a command (e.g., "text mechanic to begin work on car"), and/or any other type of communication. The mobile user device can receive the user input and store it in one or more memory device(s) of the mobile user device. The voice message can be stored with a timestamp indicative of a time associated with the receipt of the user input.

In some implementations, the mobile user device can identify contextual data indicative of one or more computing device(s) within proximity of the mobile user device at the time of receiving the user input. For instance, the mobile user device can be located at a stadium when it receives the user input—"who has played the most consecutive MLB baseball games?" In the event that the mobile user device is Bluetooth enabled, the mobile user device can obtain contextual data (e.g., identifiers, signal strength) associated with the computing device(s) within and/or around the stadium (e.g., stadium computing devices, other user devices) via Bluetooth low energy protocol. Such contextual data can be stored with the voice message (and/or the timestamp) and can be used to determine the location of the mobile user device when the voice message was received, as further described herein.

The mobile user device can store the voice message, timestamp, and/or contextual data until the mobile user device detects that it is within a communication range with one or more secure computing device(s). As used herein, the secure computing device(s) can include a device that can help provide end-to-end security (e.g., of data receipt and transmit) for upload of a voice message (and its associated data) to the server(s). In some implementations, the secure computing device(s) can be associated with the user and/or can be given permission/authority to receive and/or transmit voice messages of the user. By way of example, a user's phone and/or an authorized friend's phone can be a secure computing device. In some implementations, the secure computing device(s) can be paired with the mobile user device. Once the mobile user device recognizes that it is within a communication range (e.g., for transfer of Bluetooth Low Energy data packets) with one or more secure computing device(s), the mobile user device can provide an output indicative of the voice message and at least one of the timestamp and the contextual data to the secure computing device(s).

In some implementations, the mobile user device can asynchronously provide the output to the one or more secure computing device(s). By way of example, the user may be hiking in a remote area, outside the communication range of any secure computing devices. The user may record a voice input disclosing an idea for a start-up company at first time, when the user (and the mobile user device) are in the remote area. The mobile user device can store the data indicative of the voice message (e.g., regarding the start-up) in its local, limited memory devices. Several hours later, at a second time, the user may return home from the hike and the mobile user device may detect that it is within the communication range of the user's smartphone. Thus, at this later time (e.g., second time), the mobile user device can provide an output indicative of at least the voice message to the user's smartphone (e.g., a secure computing device).

The secure computing device(s) can receive the voice message and associated data and provide it to the one or more server(s) (e.g., of a cloud-based system). For example, a secure computing device can utilize its communication capability to provide an output indicative of the voice message (and associated data) to the server(s) via a network (e.g., internet). This can allow the voice message to be uploaded to the server(s) despite the mobile user device's inability to communicate via such a network.

The server(s) can receive, from the secure computing device(s), the output indicative of the voice message and its associated data (e.g., timestamp, contextual data) and can process the output to perform a variety of tasks. For instance, the server(s) can process the voice message to create a transcription of the voice message. Moreover, the server(s) can determine a location associated with the voice message based, at least in part, on the contextual data. For example, the server(s) can examine the identifiers and/or signal strengths recorded from the computing device(s) at the stadium (e.g., stadium computing devices, other user devices) to determine that the mobile user device was at the stadium when the voice message was received. In some implementations, the server(s) can process the output to take an action associated with the voice message. For example, in the event that the voice message indicates a question—"who has played the most consecutive MLB baseball games?"—the server(s) can use its search algorithms to determine an answer to the question.

The server(s) can provide an output indicative of the voice message for display on a user interface of a display device. The display device can be associated with one of the secured computing device(s) (e.g., the user's phone) and/or another device associated with the user. The user interface can display the voice message, the transcription of the voice message, a time associated with the voice message, a location associated with the voice message, an action taken with respect to the voice message, and/or other information, as further described herein. For example, the user interface can indicate the mobile user device was located at the stadium, at 1:34 pm PT, when the user asked the question "who has played the most consecutive MLB baseball games?", and/or an answer to the question—"Cal Ripken, Jr." In some implementations, the user interface can allow the user to audibly produce (e.g., play) the voice message and/or edit the transcription.

Capturing voice messages associated with a limited hardware mobile user device according to example aspects of the present disclosure can enable a user to interact with a remote server system without having a more robust conventional computing device nearby. Moreover, the mobile user device can remain lightweight and wearable by having limited communication hardware and instead utilize the communicability of the secure computing devices to upload voice messages. Further, by allowing the voice messages to be uploaded to the servers asynchronously, there is no immediate impact on the user in the case of a recognition failure.

The systems, methods, and apparatuses of the present disclosure provide an improvement to user device computer technology by enabling a user device of limited computing capability to receive a voice message and contextual data at one time and to provide (asynchronously, at a second time) an output indicative of the voice message and the contextual data to at least one other computing devices (e.g., with a more robust computing capability). The more robust computing devices can then provide such data to one or more servers via a network. This can improve user device computer technology because it allows the user device to leverage and utilize the computing resources of the other (more robust) devices to provide voice messages and contextual data to remote servers (e.g., of a cloud-based server system), despite the user device's computing limitations. Accordingly, the capability of the limited user device can be increased without additional hardware (and substantial additional costs).

Figure 1:
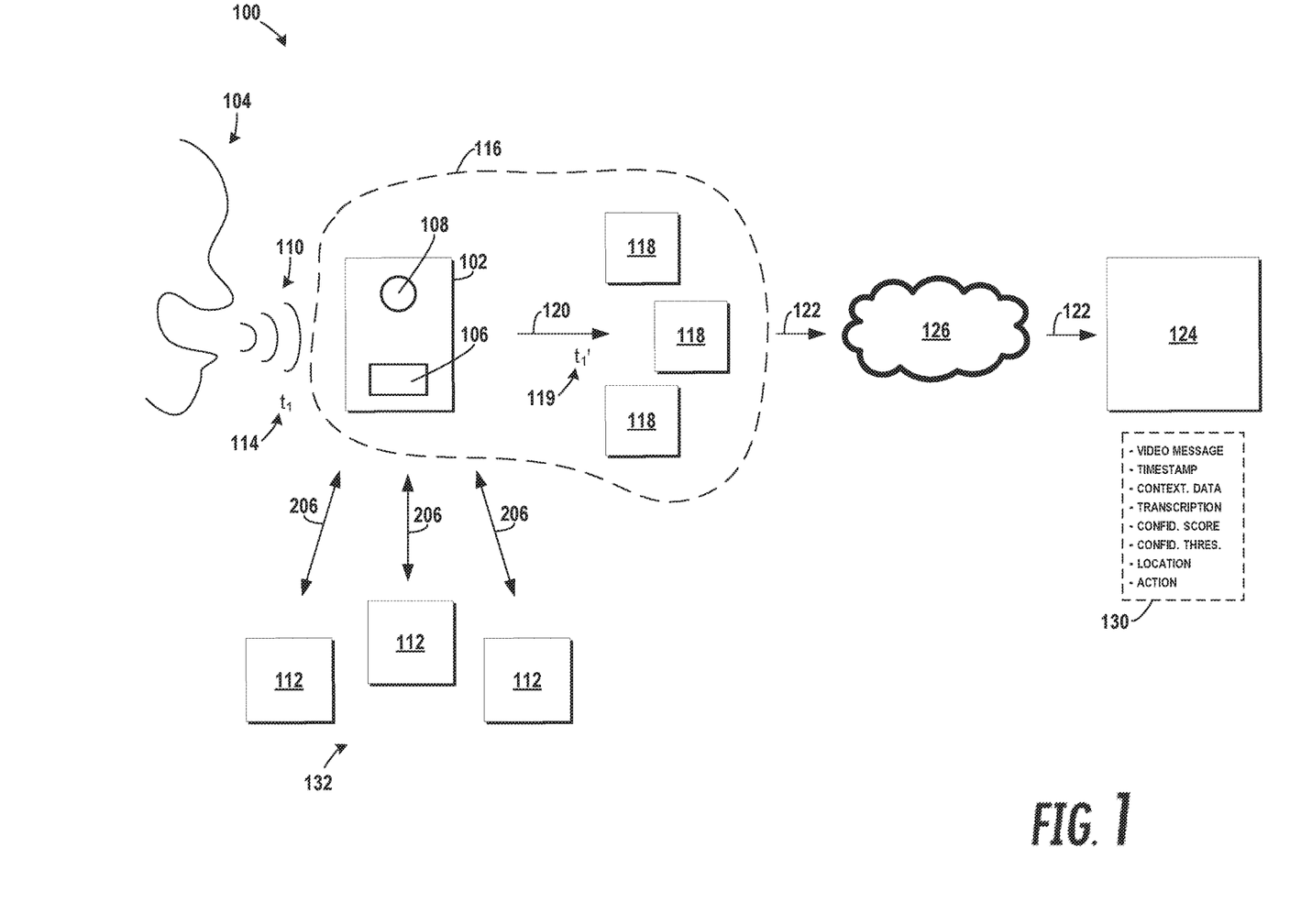
FIG. 1 depicts an example system according to example embodiments of the present disclosure.

With reference now to the FIGS., example embodiments of the present disclosure will be discussed in further detail. FIG. 1 depicts an example system 100 for capturing voice messages according to example embodiments of the present disclosure. As shown, the system 100 can include a mobile user device 102 that can be associated with and/or utilized by a user 104. The mobile user device 102 can be configured such that is transportable (e.g., able to be carried) by the user 104. In some implementations, the mobile user device 102 can be a wearable device (e.g., as pinbutton, necklace, bracelet charm, tie clip), making it easily transportable and accessible for the user 104. In some implementations, the user 104 can place the mobile user device 102 (e.g., on a fridge) such that it can be readily accessible when the user 104 is within the vicinity of the user device 102

The mobile user device 102 can include various components for performing various operations and functions as described herein. The mobile user device 102 can be a limited computing device that includes less computational resources than a typical smartphone, smart watch, tablet, etc. The mobile user device 102 can include limited (or none) processing capability, memory capacity, display capability, communicability, etc. The mobile user device 102 can include a light hardware infrastructure for capturing and transmitting a voice message from the user 104. For instance, the mobile user device 102 can include an input device 106 to receive a user input indicative of a voice message from a user 104 of the mobile user device 102. The input device 106 can include, for example, a device configured to receive a voice message from a user, such as a microphone. In some implementations, the mobile user device 102 can include one or more activation component(s) 108. The activation component(s) 108 can be configured to activate and/or de-activate the input device 106, for example, to receive a voice message from the user 104. The activation component(s) 108 can include physical buttons, soft buttons, toggles, switches, other mechanical components, etc. As further described herein, the computing device 102 can include one or more processor(s) and one or more memory device(s). The one or more memory device(s) can store instructions that when executed by the one or more processor(s) cause the one or more processor(s) to perform the operations and functions, for example, such as those described herein for capturing voice messages.

In some implementations, the mobile user device 102 can be incapable of communicating via an internet network. For example, to limit the hardware requirements, internet connectivity components can be omitted from the mobile user device 102 to save size and/or power requirements. As such, the mobile user device 102 can be lighter-weight, but without internet connectivity. In some implementations, the mobile user device 102 can be configured to communicate via an internet network (e.g., have internet connectivity).

The mobile user device 102 can be configured to receive a user input 110 indicative of a voice message. The user input 110 can be an audio input provided by the user 104 of the mobile user device 102. The user input 110 can include content such as, for example, a reminder to do something (e.g., "remind me of this place"), a memo (e.g., "I like walking at night"), a question (e.g., "who has played the most consecutive MLB baseball games?"), a command (e.g., "text mechanic to begin work on car"), and/or any other type of communication. The voice message can be, for example, a communication that does not need immediate action, response, answer, etc.

In some implementations, the user 104 can initiate the user input 110 by activating the activation component(s) 108 of the mobile user device 102. For example, the user 104 can interact with (e.g., depress, select, press) the activation component(s) 108 (e.g., buttons) to activate the input device 106 to receive the user input 110 indicative of the voice message. This can occur without the mobile user device 102 launching a software application (e.g. "app") for recording such a voice message. The user 104 can provide (e.g., speak)

the user input 110 to the mobile user device 102 such that the mobile user device 102 can record the voice message and store it in its memory device(s). When the user 104 has completed the user input 110, the user 104 can cease interaction with (e.g., release) the activation component(s) 108, to stop recording of the voice message.

The mobile user device 102 can be configured to identify contextual data associated with one or more computing device(s) 112 within proximity of the mobile user device 102 (and its one or more processor(s)) at a time 114 associated with the user input 110. The computing device(s) 112 can include a mobile computing device, a device associated with a user, a phone, a smart phone, a computerized watch (e.g., a smart watch), computerized eyewear, computerized headwear, other types of wearable computing devices, a tablet, a personal digital assistant (PDA), a laptop computer, a desktop computer, a gaming system, a media player, an e-book reader, a television platform, a navigation system, a digital camera, an appliance, an embedded computing device, or any other type of mobile and/or non-mobile computing device. The computing device(s) 112 can be associated with other individuals, nearby entities, the location of the mobile user device 102, etc. The contextual data can provide contextual information about the computing device(s) 112 and/or the locations associated with the computing device(s) 112. For instance, the contextual data indicative of the one or more computing device(s) 112 can be indicative of an identifier (e.g., UUID, device ID, IP address, service provider ID, serial number) associated with the respective computing device 112, a location (e.g., 132) associated with the respective computing device, a signal strength (e.g., transmitter power output) associated with the computing device 112, etc. The contextual data can separately searchable and identifiable (e.g., separately from data indicative of the voice message). The contextual data 206 can be processable to determine a location associated with the mobile user device 102.

By way of example, the mobile user device 102 can be located at a stadium when it receives the user input 110 at the time 114 (e.g., $t_1$)—"who has played the most consecutive MLB baseball games?" In the event that the mobile user device 102 is Bluetooth enabled, the mobile user device 102 can obtain contextual data (e.g., UUIDs, signal strengths) associated with the computing device(s) 112 within and/or around the stadium via Bluetooth low energy protocol at or around the time 114. In this example, such computing device(s) 112 can be computing devices associated with the stadium, computing devices associated with other patrons, etc. The contextual data can be stored with the voice message (and/or the timestamp) and can be used to determine the location of the mobile user device 102 when the voice message was received, as further described herein.

The mobile user device 102 can be configured to provide (e.g., for storage in one or more of its memory devices), a set of data indicating the voice message and at least one of a timestamp indicative of the time 114 associated with the user input 110 and/or the contextual data indicative of the one or more computing device(s) 112. For example, FIG. 2 depicts an example set of data 200 according to example embodiments of the present disclosure. As shown, the set of data 200 can include a voice message 202, a timestamp 204, and/or contextual data 206. The voice message 202 can be the voice message indicated in the user input 110 received by the mobile user device 102. The timestamp 204 can be indicative of a time associated with the voice message 202 (e.g., as 24-hour clock, 12-hour clock, amount of time relative to a reference time). For instance, the timestamp 204 can be indicative of the time at which the mobile user device 102 received the user input 110, stored the voice message 202, and/or identified the contextual data 206.

By way of example, the set of data 200 can include a voice message 202A provided via the user input 110. The voice message 202A can include a question, such as "who has played the most consecutive MLB baseball games?" The user input 110 can be received by the mobile user device 102 at 1:34 pm PT (e.g., $t_1$). The mobile user device 102 can identify contextual data 206A (e.g., UUID, signal strength) of one or more computing device(s) 112 within proximity of the mobile user device 102 at and/or near 1:34 pm PT (e.g., when the user input 110 is received). The mobile user device 102 can be configured to store the set of data 200 indicating the voice message 202A, a timestamp 204A (e.g., indicative of 1:34 pm PT), and/or the contextual data 206A in one or more memory device(s) of the mobile user device 102.

Returning to FIG. 1, the mobile user device 102 can be configured to detect that the mobile user device 102 is within a communication range 116 with one or more secure computing device(s) 118. The communication range 116 can be, for example, a range in which the mobile user device 102 can, at least, send data to the secure computing device(s) 118. In some implementations, the communication range 116 can be a range in which the mobile user device 102 and the secure computing device(s) 118 can send and/or receive communications from one another. As indicated above, the secure computing device(s) 118 can include a device that can help provide end-to-end security (e.g., of data receipt and transmit) for upload of a voice message 202 and its associated data (e.g., timestamp 204, contextual data 206) to the server(s). In some implementations, the secure computing device(s) 118 can be associated with the user 104 and/or can be given permission/authority to receive and/or transmit voice messages of the user 104. By way of example, a user's phone and/or an authorized friend's phone can be a secure computing device 118. In some implementations, devices of a certain type (e.g., Android enabled devices) can be considered secure computing device(s).

The mobile user device 102 can be configured to search for and identify the secure computing device(s) 118. For example, the mobile user device 102 can send one or more first signal(s) (e.g., via Bluetooth protocol, UWB, RF) to determine whether any secure computing device(s) 118 are within the communication range 116. The first signal(s) can be encoded to request and/or induce a response signal from the receiving device(s). For instance, one or more secure computing device(s) 118 can receive the first signal(s) and send one or more second signal(s) to the mobile user device 102, indicating that the secure computing device 118 is within the communication range 116 and/or that the secure computing device 118 can receive data from the mobile user device 102. The second signal(s) can also, and/or alternatively, indicate the respective secure computing device 118 (e.g., that sent the second signal). The mobile user device 102 can be configured to identify one or more secure computing device(s) 118 (e.g., within the communication range 116) based, at least in part, on the second signal(s). The mobile user device 102 can select one or more of the identified secure computing device(s) 118, within the communication range 116, for provision of the voice message and its associated data.

The above described approach for identification of the secure computing device(s) 118 by the mobile user device 102 is not intended to be limiting. One of ordinary skill in the art would understand that various techniques and/or methods can be used for the mobile user device 102 to determine whether and/or what secure computing device(s) 118 are within the communication range 116 and/or can receive data from the mobile user device 102. For example, in some implementations, the secure computing device(s) 118 can provide signals to the mobile user device 102 (e.g., indicating and/or identifying secure computing device(s) 118 within the communication range 116) without receiving the first signals from the mobile user device 102.

The mobile user device 102 can be configured to provide an output indicative of the voice message 202 and at least one of the timestamp 204 and the contextual data 206 to the one or more secure computing device(s) 118. For example, once the mobile user device 102 recognizes that it is within the communication range 116 (e.g., for transfer of Bluetooth Low Energy data packets) with a secure computing device 118, the mobile user device 102 can be configured to provide a first output 120 to the secure computing device(s) 118. By way of example, the first output 120 can be indicative of one or more voice message(s) 202A-C, the timestamps 204A-C associated with the respective message(s) 202A-C, and/or the contextual data 206A-C associated with the respective message(s) 202A-C.

In some implementations, the mobile user device 102 can asynchronously provide the output 120 to the one or more secure computing device(s) 118 when the mobile user device 102 is within the communication range 116. For instance, the mobile user device 102 can receive the user input 110 indicative of the voice message 102 at a first time (e.g., 114). The mobile user device 102 may not be able to communicate with the secure device(s) 118 around the first time 114 (e.g., be outside the communication range 116). The mobile user device 102 can store the set of data 200 (e.g., indicating the voice message 202 and associated data) in its memory device(s) for some time period. At a second time 119 (e.g., $t_1'$), different from the first time (e.g., 114), the mobile user device 102 can provide the output 120 to the secure computing device(s) 118. In some implementations, the second time 119 can be associated with a time at which the mobile user device 102 is within the communication range 116. In this way, the mobile user device 102 can asynchronously receive the voice message and provide it to the secure computing device(s) 118.

By way of example, the user 104 may be hiking in a remote area, outside the communication range of any secure computing devices. The user 104 may provide an input 110 to the mobile user device 102 disclosing an idea for a start-up company at first time 114, when the user 104 and the mobile user device 102 are in the remote area. The mobile user device 102 can store the data indicative of the voice message 202 (e.g., regarding the start-up) in its local, limited memory devices. Several hours later, at a second time 119, the user 104 may return home from the hike and the mobile user device 102 may detect that it is within the communication range 116 of a secure computing device 118 (e.g., the user's smartphone). Thus, at this later time (e.g., second time 119), the mobile user device 102 can provide an output indicative of at least the voice message 202 to the secure computing device 118.

The secure computing device(s) 118 can be configured to receive the first output 120 from the mobile user device 102. The secure computing device(s) 118 can be configured to provide a second output 122 indicative of at least the voice message 202 to one or more server(s) 124 via a network 126 (e.g., internet network). The server(s) 124 can be remote from the mobile user device 102 and/or the secure computing device(s) 118. The server(s) 124 can be associated with, for example, a cloud-based system. For instance, a secure computing device 118 can utilize its communication capability to provide an output 122 indicative of the voice message 202, the timestamp 204, and/or the contextual data 206 to the server(s) 124 via the network 126. In some implementations, this can allow the voice message 202 (and its associated data) to be provided to the server(s) 124, via the secure computing device(s) 118 that can be capable of communicating via the network 126 (e.g., internet), even though the mobile user device 102 may be incapable of communicating via the network 126.

The server(s) 124 can receive, from the secure computing device(s) 118, the output 122 indicative of the voice message 202 and its associated data (e.g., timestamp 204, contextual data 206) and can process the output 122 to perform a variety of tasks. For instance, the server(s) 124 can process the voice message 202 to create a transcription of the voice message 202. By way of example, the output 122 can include waveform data associated with the voice message 202. The server(s) 124 can include one or more language model(s) that can be applied to the voice message 202 (e.g., waveform data) to generate a transcription of the voice message 202. In some implementations, the language model(s) can include a "general" or "generic" language model trained on one or more natural languages, e.g., English, Spanish, Italian, Korean. That is, in some implementations, the language model may not be specific to the user 104, but rather can be utilized for a general population of users accessing the server(s) 124. For example, one or more of the language model(s) can be trained on and/or utilized for English speakers that live in the United States of America.

Additionally, and/or alternatively, the server(s) 124 can determine a content of the voice message 202. As indicated above, the voice message 202 can include content such as a reminder to do something, a memo, a question, a command, other types of communication, etc. In some implementations, the server(s) 124 can include a parser and/or a rules database to determine the content of the voice message 202. For example, the transcription of the voice message 202 can be provided to a parser that can use a rules database to determine the content of the voice message 202. Each rule of the rules database can be associated with a particular type of content (e.g., reminder, memo, question, command, other). The parser can compare at least a portion of the transcription of the voice message 202 to the rules of the rules database. The parser can determine whether at least a portion of the transcription of the voice message 202 satisfies at least one rule of the rules database, and/or matches a text pattern associated with a rule. The server(s) 124 can determine the content of the voice message 202 based, at least in part, on whether at least a portion of the transcription satisfies at least one rule of the rules database, and/or matches a text pattern associated with a rule. For example, a rule can include that when a transcription includes the word "remind," or "reminder," at an initial portion of the transcription, the voice message 202 likely includes a reminder.

In some implementations, the server(s) 124 can be configured to generate a confidence score based, at least in part, on the transcription of the voice message 202. For instance, the server(s) 124 can process the waveform data associated with the voice message 202. The server(s) 124 can be configured to generate a confidence score that is indicative of a confidence level associated with the accuracy of the transcription. By way of example, the mobile user device 102 can obtain a voice message 202B (e.g., "remind me of this place") when the mobile user device 102 is in a park, with little background noise obstructing the clarity of the voice message. Accordingly, the server(s) 124 can more easily transcribe the voice message 202B and/or parse the transcription for the message content. In such a case, the server(s) 124 can generate and/or assign a higher confidence score to the transcription of the voice message 202B indicating that the server(s) 124 are more confident in the accuracy of the transcription and/or the message's content.

In another example, the mobile user device 102 can obtain a voice message 202C (e.g., "text mechanic to begin work on car") when the mobile user device 102 is in a busy restaurant, with a greater amount background noise obstructing the clarity of the voice message. In such a case, it may be difficult for the server(s) 124 to transcribe the voice message 202C and/or parse the transcription for the message content. In such a case, the server(s) 124 can generate and/or assign a lower confidence score to the transcription of the voice message 202C indicating that the server(s) 124 are less confident in the accuracy of the transcription and/or the message's content.

The server(s) 124 can perform one or more action(s) based, at least in part, on the output 122, the transcription of the voice message 202, and/or the content of the voice message 202. The action(s) can be tasks associated with the voice message 202. For instance, the server(s) 124 can determine a location associated with the voice message 202 based, at least in part, on the contextual data 206. The contextual data 206 can be processable to determine a location associated with the mobile user device 102 (e.g., at or near the first time 114).

By way of example, the mobile user device 102 can be located within a stadium when it receives a user input 110 indicative of the voice message 202A (e.g., "who has played the most consecutive MLB baseball games?"). As described herein, the mobile user device 102 can identify contextual data 206A associated with one or more computing device(s) 112 at the stadium (e.g., stadium computing devices, other user devices). The output 122 obtained by the server(s) 124 can include the contextual data 206A. The server(s) 124 can determine that the mobile user device 102 was at the stadium when the voice message 202A was received based, at least in part, on the contextual data 206A associated with one or more computing device(s) 112 at the stadium.

Additionally, and/or alternatively, the server(s) 124 can be configured to perform actions that can be responsive to the voice message 202. For instance, the voice message 202A can include content and the server(s) 124 can perform an action based, at least in part, on the content. By way of example, the content of the voice message 202A can include a question (e.g., "who has played the most consecutive MLB baseball games?"). The server(s) 124 can perform a search action (e.g., via search algorithms) based, at least in part, on the content of the voice message 202A to determine an answer to the question (e.g., Cal Ripken, Jr.). In another example, the content of the voice message 202B can include a request for a reminder (e.g., "remind me of this place"). The server(s) 124 can perform an action to remind the user 104 of the place. For instance, the server(s) 124 can display a reminder on a device associated with the user 104 (as further described herein). In such a case, the storage and presentation of the transcription and/or location of the place can be considered the action taken by the server(s) 124. Additionally, and/or alternatively, the server(s) 124 can place a maker on a map for display via a user interface for the user 104. In another example, the voice message 202 can include a command (e.g., "schedule meeting, August $25^{th}$") and the server(s) 124 can create an event on an electronic calendar associated with the user 104. In yet another example, the voice message 202 can include a command (e.g., "turn off porch lights") and the server(s) 124 can perform an action by communicating with one or more other device(s) to complete the action associated with the voice message 202 (e.g., communicate with one or more home device(s) to turn off the porch lights). One of ordinary skill in the art would understand that these examples are not intended to be limiting as the server(s) 124 can perform any other suitable actions that may be associated with and/or responsive to the voice message 202 such as, sending a text, sending an email, deleting data, archiving data, sharing data, making a transaction, cancelling an event or transaction, etc.

In some implementations, the server(s) 124 can determine whether to perform an action based, at least in part, on the confidence score. The server(s) 124 can implement a confidence threshold indicating the minimum confidence score required, suggested, etc. for the server(s) 124 to perform an action associated with the voice message 202. In the event that the confidence score associated with a transcription of the voice message 202 is above the confidence threshold, the server(s) 124 can perform an action associated with the voice message 202. However, in the event that the confidence score associated with a transcription of the voice message 202 is below the confidence threshold, the server(s) 124 may not perform, cease performing, delay performing, etc. an action associated with the voice message 202.

For example, the mobile user device 102 can obtain a voice message 202C (e.g., "text mechanic to begin work on car") when the mobile user device 102 is in a busy restaurant, with a great amount background noise obstructing the clarity of the voice message 202C. Thus, it may be difficult for the server(s) 124 to transcribe the voice message 202C and/or parse the transcription for the message content. The server(s) 124 may mistakenly transcribe the voice message 202C as "test meg and nick to beg and work on car". The server(s) 124 can generate and/or assign a lower confidence score to such a transcription of the voice message 202C indicating that the server(s) 124 are less confident in the accuracy of the transcription and/or the message's content. The server(s) 124 may not perform an action associated with the voice message 202C based on the confidence score. For example, the lower confidence score can be below the confidence threshold (e.g., indicating the minimum confidence level for performing an action). As further described herein, in some implementations, the server(s) 124 can provide the transcription to the user 104 for edit, correction, approval, etc. and/or allow the user 104 to indicate that the server(s) 124 should indeed take action with respect to the voice message 202C.

The server(s) 124 can be configured to store a second set of data 130. The second set of data 130 can be indicative of the voice message 202, the timestamp 204, the contextual data 206, the transcription of the voice message 202, a confidence score associated with the transcription, a confidence threshold, a location associated with the voice message 202, an action taken with respect to the voice message 202, and/or any other data associated therewith. The server(s) 124 can be configured to use such information to generate an output for display.

Figure 3:
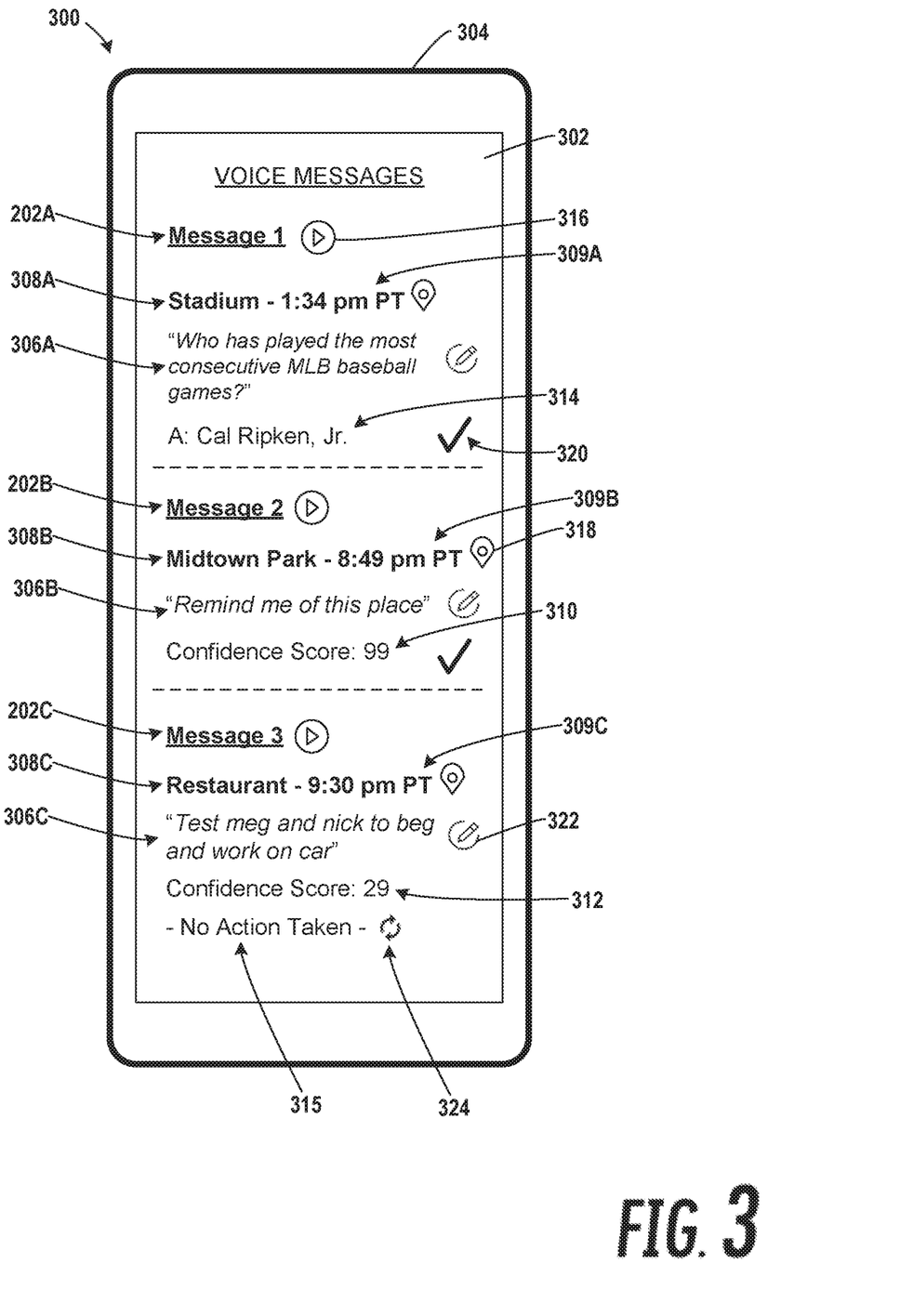
FIG. 3 depicts an example user interface according to example embodiments of the present disclosure.

FIG. 3 depicts an example user interface 300 according to example embodiments of the present disclosure. The server(s) 124 can provide for display a third output 302 in the user interface 300 presented on a display device 304. The display device 304 can be associated with, for instance, a smartphone, tablet, wearable device, laptop, desktop, mobile device, device capable of being carried by a user while in operation, display with one or more processors, vehicle system, and/or other user device. In some implementations, the display device 304 can be associated with the user 104 of the mobile user device 102. In some implementations, the display device 304 can be associated with a secure computing device 118.

The output 302 can be indicative of the voice message 202 and/or other various information associated therewith. For example, the output 302 can be indicative of the voice message(s) 202A-C and a transcription 306A-C of the voice message 202A-C. Additionally, and/or alternatively, the third output 302 can be indicative of a location 308A-C associated with the voice message 202A-C based, at least in part, on the contextual data 206A-C. Moreover, the third output 302 can be indicative of a time 309A-C (e.g., the time 114 associated with receiving the user input 110, the timestamp 206, a time at which the mobile user device 102 is at the location 308A-C).

In some implementations, the third output 302 can be indicative of a confidence score associated with the transcription. For example, the confidence score 310 (e.g., "99") associated with the transcription 306B (e.g., "remind me of this place") can indicate a higher confidence level associated with the transcription of the voice message 202B. The confidence score 312 (e.g., "29") associated with the transcription 306C (e.g., "test meg and nick to beg and work on car") can indicate a lower confidence level associated with the transcription of the voice message 202C. In this way, the user interface 300 can indicate to the user 104 the confidence associated with the accuracy of the respective transcription.

In some implementations, the third output 302 can be indicative of an action taken with respect to a voice message 202. For example, in the event that the voice message 202A includes a question (e.g., "who has played the most consecutive MLB baseball games?"), the third output 302 can be indicative of the action 314 taken by the server(s) 124 and associated with the voice message 202 (e.g., an answer "Cal Ripken, Jr." to the question). In some implementations, the voice message 202B can include a reminder request. Accordingly, the action taken by the server(s) 124 can be to remind the user 104 of the voice message 202B by displaying the transcription 306B and/or the location 308B on the user interface 300. Additionally, and/or alternatively, the action can include placing a marker on a map that can be displayed on the display device 304 (e.g., by selecting a hyperlink and/or icon associated with the location 308B shown on the user interface 300).

In some implementations, the third output 302 can be indicative of when no action has been taken by the server(s) 124. For example, the confidence score 312 associated with the transcription 306C and/or the voice message 202C can be below a confidence threshold (e.g., "85") for taking action with respect to the voice message 202C. As such, the server(s) 124 can determine that no action associated with the voice message 202C should be taken by the server(s) 124 (at least temporarily). The third output 302 can include an indication 315 that the server(s) 124 have not taken action associated with the voice message 202C (e.g., due to the low confidence score).

The user interface 300 can allow interaction by the user 104. For example, the user interface 300 can include a first interactive element 316 (e.g., soft button) that allows a user 104 to select the voice message 202 to be audibly produced (e.g., played) via an output device (e.g., speaker). This can allow the user 104 to hear and/or remember the voice message 202 previously captured by the mobile user device 102.

Additionally, and/or alternatively, the user interface 300 can include a second interactive element 318 that allows a user to view information associated with the location 308A-C associated with the voice message 302A-C, (e.g., determined by the server(s) 124 based on the contextual data 206A-C). For example, the user can interact with the second interactive element 318 to cause one or more image(s) associated with the location 308B (e.g., "Midtown Park") to appear on the display device 304. Additionally, and/or alternatively, the user can interact with the second interactive element 318 to display a map interface with a marker indicating the location 308B.

The user interface 300 can also, and/or alternatively, allow a user to approve of the information associated with the voice message 202. By way of example, the user interface 300 can include a third interactive element 320 that allows a user to approve of the transcription 306A, the location 308A-C, the time 309A-C, the action 314, etc. performed by the server(s) 124 with respect to the voice message 202A (e.g., the answer to the question).

Additionally, and/or alternatively, the user interface 300 can allow a user to edit the transcription 306A-C associated with the voice message 202A-C. For instance, the user 104 can listen to the voice message 202C to remember what she said in the voice message 202C (e.g., "text mechanic to begin work on car"). After reviewing the transcription 306C, the user 104 can learn that voice message 202C has been transcribed incorrectly. Thus, the user can interact with a fourth interactive element 322 to edit the transcription 306C (e.g., to correct the transcription errors).

The user interface 300 can allow a user to request that the server(s) 124 perform and/or re-perform a task associated with a voice message. For instance, after editing the transcription 306C to correctly indicate the voice message 202C (e.g., "text mechanic to begin work on car"), the user 104 can interact with a sixth interaction element 324 to request that the server(s) 124 perform a task associated with a voice message 202C. The server(s) 124 can receive data indicative of the action request and perform an action associated with the voice message 202C in accordance with the edited transcription. Once the action is completed, the server(s) 124 can provide an updated output in the user interface 300 presented on the display device 304. The updated output can indicate the action associated with the voice message 202C and/or the edited transcription (e.g., "text sent to mechanic to begin work on car"). The indication 315 that the server(s) 124 have not taken action associated with the voice message 202C can be replaced with an indication that an action has been taken. In some implementations, the user can request the server(s) 124 re-do an action associated with a voice message (e.g., via interaction with the sixth element 324), even though an action has already been performed.

The server(s) 124 can be configured to update its models and/or algorithms based, at least in part, on an approval and/or edit made by the user 104. For example, the server(s) 124 can implement machine learning techniques to update its language models, rules databases, etc. based, at least in part, on an approval and/or edit made by the user 104. Additionally, and/or alternatively, the server(s) 124 can implement machine learning techniques to update the algorithms used for determining locations, as well as identifying and/or taking actions with respect to a voice message 202 based, at least in part, on an approval and/or edit made by the user 104. In this way, the server(s) 124 can use "feedback" from the users to potentially increase the accuracy of future transcriptions, location determinations, and/or actions.

The numbers, orientations, types, arrangements, shapes, sizes, images, etc. of the user interface 300 and the elements of the user interface 300 are not meant to be limiting. Those of ordinary skill in the art, using the disclosures provided herein, will understand that the user interface and the elements discussed herein can be adapted, rearranged, expanded, omitted, or modified in various ways without deviating from the scope of the present disclosure. For example, one or more interactive elements can perform the same and/or similar functions as one or more other interactive elements.

Figure 4:
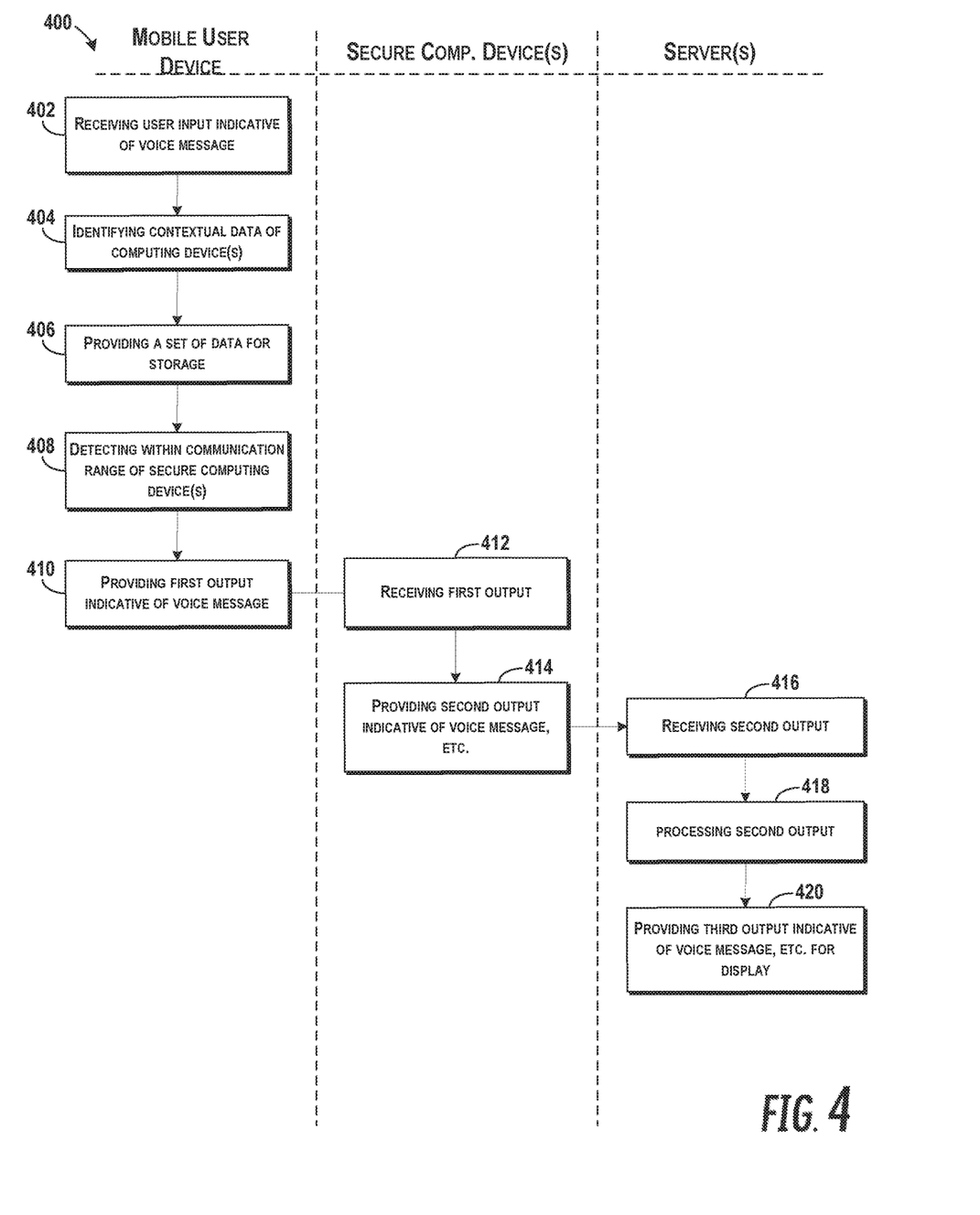
FIG. 4 depicts a flow chart of an example method of capturing voice messages according to example embodiments of the present disclosure.

FIG. 4 depicts a flow chart of an example method 400 of capturing voice messages according to example embodiments of the present disclosure. One or more portion(s) of method 400 can be implemented by a limited mobile user device (e.g., with constrained processing capability, memory capacity, and/or communicability), one or more secure computing device(s), and/or one or more server(s) such as, for example, those shown in FIGS. 1 and 5. FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402) the method 400 can include receiving user input indicative of a voice message. For instance, the mobile user device 102 can receive a user input 110 indicative of a voice message 202. The user input 110 can be provided by a user 104 of the mobile user device 102. For instance, the user 104 can activate an input device 106 (e.g., a microphone) via an activation component 108 (e.g., one or more button(s)) such that the mobile user device 102 can record the voice message 202. The voice message 202 can include content such as, for example, a reminder to do something (e.g., "remind me of this place"), a memo (e.g., "I like walking at night"), a question (e.g., "who has played the most consecutive MLB baseball games?"), a command (e.g., "text mechanic to begin work on car"), and/or any other type of communication.

At (404), the method 400 can include identifying contextual data of one or more computing device(s). For instance, the mobile user device 102 can identify contextual data 206 indicative of one or more computing device(s) 112 within proximity of the mobile user device 102 at a time 114 associated with receiving the user input 110. The contextual data 206 can be indicative of at least one of an identifier associated with the respective computing device 112 and a signal strength associated with the computing device 112. By way of example, the mobile user device 102 can be located at a stadium when it receives the user input 110 indicative of the voice message 202A (e.g., "who has played the most consecutive MLB baseball games?"). The mobile user device 102 can obtain the contextual data 206C associated with the computing device(s) 112 within and/or around the stadium (e.g., stadium computing devices, other user devices) by communicating with the computing device(s) 112 (e.g., via Bluetooth low energy protocol).

At (406), the method 400 can include providing a set of data for storage. For instance, the mobile user device 102 can provide a set of data 200 for storage in one or more memory device(s) of the mobile user device 102. The set of data 200 can indicate the voice message 202 and at least one of a timestamp 204 indicative of the time 114 associated with receiving the user input 110 and the contextual data 206 indicative of the one or more computing device(s) 112. In some implementations, the mobile user device 102 can store the voice message 202, the timestamp 204, and/or the contextual data 206 until the mobile user device 102 detects that it is within a communication range 116 with one or more secure computing device(s) 118.

At (408), the method 400 can include detecting whether the mobile user device is within a communication range of one or more secure computing device(s). For instance, the mobile user device 102 can detect that the mobile user device 102 is within a communication range 116 with one or more secure computing device(s) 118. As described herein, the mobile user device 102 can determine it is within the communication range 116 by sending and/or receiving signals with the secure computing device(s) 118. The secure computing device(s) 118 can be associated with the user 104 and/or can be given permission/authority to receive and/or transmit data from the mobile user device 102. In some implementations, certain types of device(s) (e.g., desktop computing systems) can be considered secure computing device(s) 118.

At (410), the method 400 can include providing a first output indicative of a voice message. For instance, the mobile user device 102 can provide an output 120 indicative of the voice message 202 and at least one of the timestamp 204 and the contextual data 206 to at least one of the secure computing device(s) 118. In some implementations, the mobile user device 102 may be incapable of communicating via an internet network. In such a case, the mobile user device 102 cannot provide the output 120 via the internet. The mobile user device 102 can provide the output 120 to one or more of the secure computing device(s) 118 via Bluetooth low energy protocol and/or other suitable protocols.

At (412), the secure computing device(s) 118 can receive the output from the mobile user device 102 and can provide a second output indicative of the voice message (and/or its associated data) to one or more server(s) 124. For example, the output from the mobile user device 102 can be a first output 120. One or more of the secure computing device(s) can receive the first output 120 and, at (414) provide a second output 122 indicative of the voice message 202 and at least one of the timestamp 204 and the contextual data 206 to the one or more server(s) 124 via a network 126. The one or more secure computing device(s) 118 can be capable of communicating via the internet network and, thus, the secure computing device(s) 118 can use the internet (e.g., network 126) to provide the second output 122 to the server(s) 124.

At (416), the method 400 can include receiving the second output. For instance, the one or more server(s) 124 can receive the second output 122 indicative of the voice message 202 and at least one of the timestamp 204 and the contextual data 206. The server(s) 124 can process the second output 122, at (418). For instance, the server(s) 124 can process the second output 122 to generate a transcription 306A-C associated with the voice message 202A-C. Moreover, the one or more server(s) 124 can determine a location 308A-C associated with the voice message 202 based, at least in part, on the contextual data 206. For example, the server(s) 124 can examine the identifiers and/or signal strengths recorded from the computing device(s) 112 at a stadium (e.g., stadium computing devices, other user devices) to determine that the mobile user device 102 was at the stadium when the voice message 202A was received. In some implementations, the server(s) 124 can process the second output 122 to perform one or more action(s) based, at least in part, on the second output 122, the transcription of the voice message 202, and/or the content of the voice message 202. Additionally, and/or alternatively, the server(s)

124 can be configured to perform actions that can be responsive to the voice message 202, as further described above.

The server(s) 124 can store a second set of data 130 indicative of the voice message 124 in one or more memory device(s) associate with the server(s) 124. The second set of data 130 can also be indicative of other data associated with the voice message 202. For example, the second set of data 130 can be further indicative of a transcription 306A-C associated with the voice message 202A-C, a confidence score 310, a confidence threshold, an action 314, etc.

At (420), the method 400 can include providing a third output indicative of the voice message (and/or associated data) for display. For instance, the one or more server(s) 124 can provide for display a third output 302 in a user interface 300 presented on a display device 304. The display device 304 can be associated with a user 104 of the mobile user device 102. The third output 302 can be indicative of the voice message 202 and/or other information. For example, the third output 302 can be indicative of the transcription 306A-C associated with the voice message 202A-C, a location 308A-C associated with the voice message 202A-C, a time 309A-C, a confidence score 310, etc. The user interface 300 can allow a user to select the voice message 202A-C to be audibly produced, to edit the transcription 306A-C associated with the voice message 202A-C, and/or to make other interactions, as further described herein.

Figure 5:
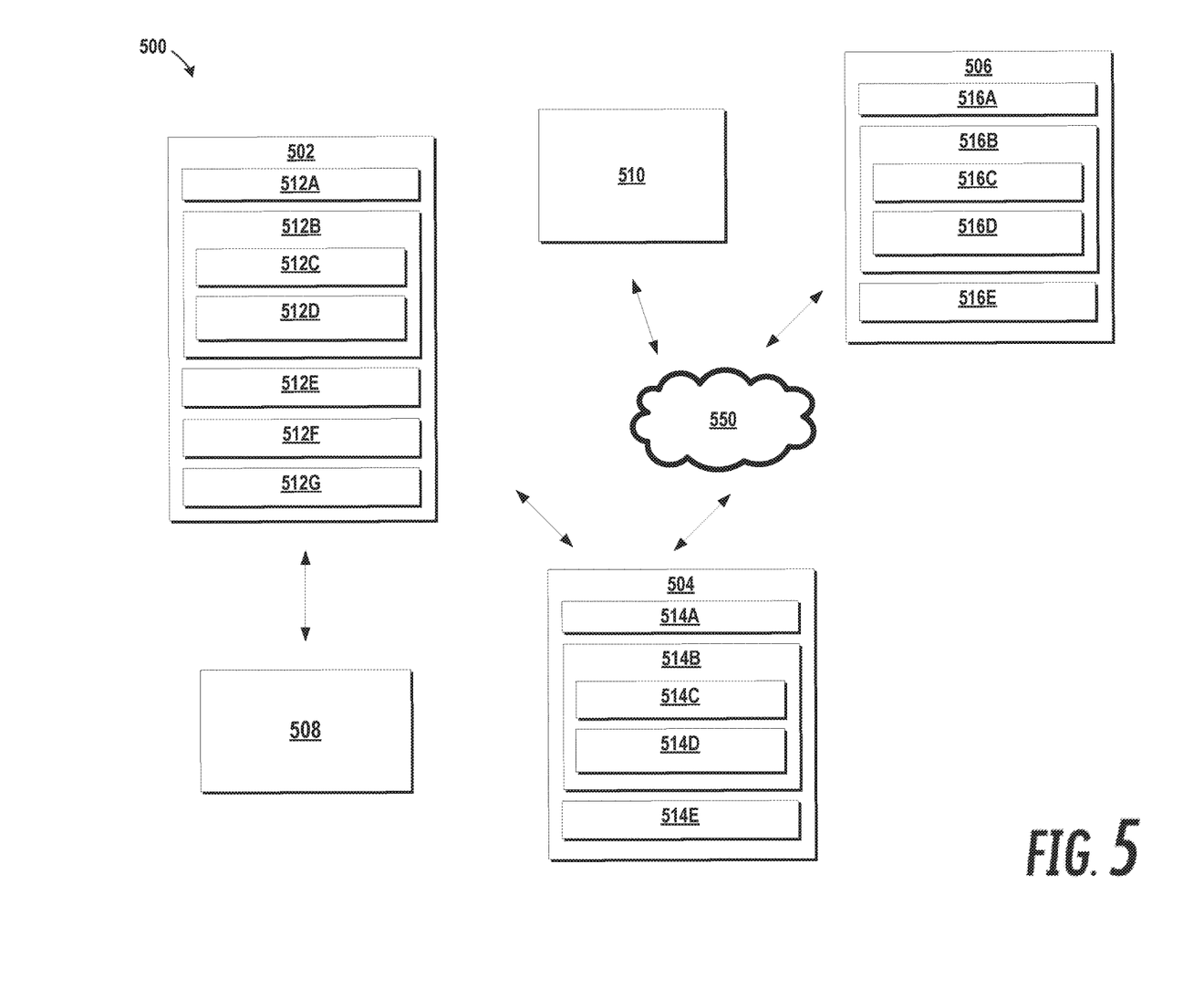
FIG. 5 depicts an example system according to example embodiments of the present disclosure.

FIG. 5 depicts an example system 500 according to example embodiments of the present disclosure. The system 500 can include a mobile user device 502, one or more secure computing device(s) 504, and one or more server(s) 506. The system 500 can also include one or more computing device(s) 508 and one or more display device(s) 510. The mobile user device 502, the secure computing device(s) 504, the server(s) 506, the computing device(s) 508, and/or the display device(s) 510 can, for instance, respectively correspond to mobile user device 102, the secure computing device(s) 118, the server(s) 124, the computing device(s) 112, and/or the display device 304, as described herein.

The mobile user device 502 can include one or more processor(s) 512A and one or more memory device(s) 512B. The one or more processor(s) 512B can include any suitable type of processing device (e.g., that can be limited), such as a microprocessor, microcontroller, integrated circuit, one or more central processing units (CPUs), processing units performing other specialized calculations, etc. The processing capabilities of the mobile user device 502 can be limited, for example, to decrease the weight, power requirements, hardware infrastructure, etc. of the mobile user device 502.

The memory device(s) 512B can include one or more computer-readable media, including, but not limited to, non-transitory computer-readable media, RAM, ROM, hard drives, flash memory, or other memory devices. The memory device(s) of the mobile user device 502 can be limited (e.g., to a small amount of nonvolatile memory) to decrease the weight and/or hardware infrastructure of the mobile user device 502. In some implementations, the memory device(s) 512B can be more robust.

The memory device(s) 512B can store information accessible by the one or more processor(s) 512A, including instructions 512C that can be executed by the one or more processor(s) 512A. The instructions 512C can be software written in any suitable programming language or can be implemented in hardware. Additionally, and/or alternatively, the instructions 512C can be executed in logically and/or virtually separate threads on processor(s) 512A.

The instructions 512C can be executed by the one or more processor(s) 512A to cause the one or more processor(s) 512A to perform operations, such as any of the operations and functions of the mobile user device 102, operations and functions for which the mobile user device 102 is configured, as described herein, and/or any other operations or functions of the mobile user device 102. By way of example, the processor(s) 512A can perform operations such as receiving a user input indicative of a voice message from a user of the mobile user device; obtaining a set of data indicating an activation of the input device; receiving the user input indicative of the voice message; identifying contextual data indicative of one or more computing devices within a proximity of the mobile user device at a time associated with receiving the user input; providing, for storage in one or more of the memory devices, a set of data indicating the voice message and at least one of a timestamp indicative of the time associated with the user input and the contextual data indicative of the one or more computing devices; detecting that the mobile user device is within a communication range with one or more secure computing devices; and providing an output indicative of the voice message and at least one of the timestamp and the contextual data to one or more secure computing devices.

The one or more memory devices 512B can also include data 512D that can be retrieved, manipulated, created, or stored by the one or more processors 512A. The data 512D can include, for instance, the set of data 200, data associated with another component of the system 500, and/or any other data/information described herein.

The mobile user device 502 can also include a communication interface 512E used to communicate with one or more other component(s) of system 500 (e.g., secure computing device(s) 504, computing device(s) 508), for example, to provide and/or receive data. The communication interface 502 can include any suitable components, including for example, transmitters, receivers, ports, controllers, antennas, or other suitable communication components. The mobile user device 502 can be configured to communication via Bluetooth low energy protocol, Zigbee based communication, near-field communication, etc. In some implementations, the communication interface 512E and/or the communicability of the mobile user device 102 can be limited (e.g., such that it is incapable of communicating via certain methods, such as an internet network). In some implementations, the communication interface 512E and/or the communicability of the mobile user device 102 can be more robust (e.g., such that it is capable of communicating via certain methods, such as an internet network). In such implementations, the mobile user device 502 can be configured to communicate via Wi-Fi, IP v 6 based communication, and/or other networks.

The mobile user device 502 can include one more activation component(s) 512F and/or input device(s) 512G. The activation component(s) 512F can include physical buttons, soft buttons, toggles, switches, other mechanical components, etc. and can be configured to activate and/or de-activate the input device(s) 512G. The input device(s) 512G can include devices, such as, a microphone suitable for voice recognition. The input device(s) 512G can receive a user input indicative of a voice message from a user of the mobile user device. In some implementations, the mobile user device 502 can include one or more output device(s) such as one or more speaker(s) (e.g., for playback of a voice message). Additionally, and/or alternatively, the mobile user device 502 can include a power source (not shown) (e.g., battery) that can be charged (e.g., via wired and/or wireless connection) and provide power to the components of the mobile user device 502.

The secure computing device(s) 504 can include any suitable type of a mobile computing device, a device associated with a user, a phone, a smart phone, a computerized watch (e.g., a smart watch), computerized eyewear, computerized headwear, other types of wearable computing devices, a tablet, a personal digital assistant (PDA), a laptop computer, a desktop computer, a gaming system, a media player, an e-book reader, a television platform, a navigation system, a digital camera, an appliance, an embedded computing device, or any other type of mobile and/or non-mobile computing device that is configured to perform the operations as described herein. The secure computing device(s) 504 can help provide end-to-end security (e.g., of data receipt and transmit) for upload of a voice message (and its associated data) to the server(s) 506. In some implementations, the secure computing device(s) 504 can be associated with the user of the mobile user device 502 and/or can be given permission/authority to receive and/or transmit data for the user and/or the mobile user device.

The secure computing device(s) 504 can include one or more processor(s) 514A and a memory device(s) 514B. The one or more processor(s) 514A can include can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) dedicated to efficiently rendering images or performing other specialized calculations. The memory device(s) 514B can include can include one or more computer-readable media, including, but not limited to, non-transitory computer-readable media, RAM, ROM, hard drives, flash memory, or other memory devices.

The memory device(s) 514B can store information accessible by the one or more processor(s) 514A, including instructions 514C that can be executed by the one or more processor(s) 514A. The instructions 514C can be software written in any suitable programming language or can be implemented in hardware. Additionally, and/or alternatively, the instructions 514C can be executed in logically and/or virtually separate threads on processor(s) 514A.

The instructions 514C can be executed by the one or more processor(s) 514A to cause the one or more processor(s) 514A to perform operations, such as any of the operations and functions for which the secure computing device(s) 118 are configured, as described herein, any of the operations and functions of the secure computing device(s) 118, operations and functions for receiving and sending outputs indicative of voice messages, and/or any other operations or functions of the secure computing device(s) 118.

The one or more memory devices 514B can also include data 514D that can be retrieved, manipulated, created, or stored by the one or more processor(s) 514A. The data 514D can include, for instance, the first output 120, the second output 122, data associated with a voice message, data associated with another component of the system 500, and/or any other data/information described herein.

The secure computing device(s) 504 can also include a communication interface 514E used to communicate with one or more other component(s) of system 500 (e.g., the server(s) 506) to provide and/or receive data. The communication interface 514E can include any suitable components for interfacing with one more networks, including for example, transmitters, receivers, ports, controllers, antennas, or other suitable components. In some implementations, the secure computing device(s) 504 can include more robust communicability than the mobile user device 502. For example, the secure computing device(s) 504 can be capable of capable of communicating via a network 550, which can be an internet network.

Additionally, and/or alternatively, the network 550 can be any type of communications network, such as a local area network (e.g. intranet), wide area network (e.g. Internet), cellular network, or some combination thereof. The network 550 can include a direct (wired and/or wireless) connection between the secure computing device(s) 504 and the server(s) 506. In general, communication between the secure computing device(s) 504 and the server(s) 506 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The server(s) 506 can include one or more processor(s) 516A and one or more memory device(s) 516B. The one or more processor(s) 516A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) dedicated to efficiently rendering images or performing other specialized calculations. The memory device(s) 516B can include can include one or more computer-readable media, including, but not limited to, non-transitory computer-readable media, RAM, ROM, hard drives, flash memory, or other memory devices.

The memory device(s) 516B can store information accessible by the one or more processor(s) 516A, including instructions 516C that can be executed by the one or more processor(s) 516A. The instructions 516C can be software written in any suitable programming language or can be implemented in hardware. Additionally, and/or alternatively, the instructions 516C can be executed in logically and/or virtually separate threads on processor(s) 516A.

The instructions 516C can be executed by the one or more processor(s) 516A to cause the one or more processor(s) 516A to perform operations, such as any of the operations and functions for which the server(s) 124 are configured, as described herein, any of the operations and functions of the server(s) 124, operations and functions for generating, receiving, and sending outputs indicative of voice messages (and associated data), and/or any other operations or functions of the server(s) 118.

The one or more memory device(s) 516B can also include data 516D that can be retrieved, manipulated, created, or stored by the one or more processor(s) 516A. The data 516D can include, for instance, the second output 122, set of data 130, the third output 302, any other data associated with a voice message, data associated with another component of the system 500, and/or any other data/information described herein.

The server(s) 506 can also include a communication interface 516E used to communicate with one or more other component(s) of system 500 (e.g., the secure computing device(s) 508, display device(s) 510) over the network 550, for example, to provide and/or receive data. The communication interface 516E can include any suitable components for interfacing with one more networks, including for example, transmitters, receivers, ports, controllers, antennas, or other suitable components.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at a server can instead be performed at a user device. Likewise, computing tasks discussed herein as being performed at the user device can instead be performed at the server.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method implemented by one or more processors of a wearable mobile user device, the method comprising:
    capturing, at the wearable mobile user device, a voice message provided by a user of the wearable mobile user device, the voice message provided by the user at a first time and provided via a microphone of the wearable mobile user device;
    identifying contextual data associated with one or more computing devices in proximity to the wearable mobile user device at or near the first time,
        wherein identifying the contextual data is based on one or more signals that are from the one or more computing devices and that are detected at the wearable mobile user device at or near the first time, and
        wherein the contextual data is processable to determine a location associated with the wearable mobile user device at or near the first time;
    in response to determining that the wearable mobile user device is outside of a communication range of one or more secure computing devices associated with the user:
        storing, in a memory of the wearable mobile user device, a set of data, the set of data including: audio data representing the voice message received at the first time, and the contextual data,
            wherein each of the one or more secure computing devices is authorized, by the user, to receive the voice message from the wearable mobile user device and to transmit the voice message to one or more servers;
    at a second time subsequent to the first time, and in response to detecting that the wearable mobile user device is within the communication range of a given secure computing device of the one or more secure computing devices associated with the user:
        transmitting the set of data to the given secure computing device, wherein transmitting the set of data to the given secure computing device causes the given secure computing device to transmit, via a network, the set of data to the one or more servers, and wherein transmitting the set of data to the one or more servers via the network causes the one or more servers to:
            determine, based on the contextual data, the location associated with the wearable mobile user device at or near the first time,
            generate a transcription of the voice message received at the first time,
            generate an indication of an action taken in response to the voice message and in view of the contextual data, and
            provide, to the given secure computing device and from one or more of the servers via the network:
                the location associated with the wearable mobile user device at or near the first time, the transcription of the voice message received at the first time, and the indication of the action taken in response to the voice message; and
        receiving, at the wearable mobile user device and from the given secure computing device:
            the location associated with the wearable mobile user device at or near the first time, the transcription of the voice message, and the indication of the action taken in response to the voice message; and
    automatically providing, for presentation to the user via a user interface of the wearable mobile user device, output based on the voice message, the output including at least the location associated with the wearable mobile user device at or near the first time, the transcription of the voice message, and the indication of the action taken in response to the voice message.

2. The method of claim 1, wherein the contextual data includes:
    an identifier associated with a given computing device, of the one or more computing devices, in proximity to the wearable mobile user device at or near the first time, and/or
    a signal strength associated with a given signal of the one or more signals that are from the one or more computing devices and that are detected at the wearable mobile user device at or near the first time.

3. The method of claim 2, wherein the one or more servers, in determining, based on the contextual data, the location associated with the wearable mobile user device at or near the first time, are to:
    process the identifier and the signal strength to determine the location associated with the wearable mobile user device at or near the first time.

4. The method of claim 1, wherein the set of data stored in the memory of the wearable mobile user device further includes a timestamp corresponding to the first time.

5. The method of claim 1, wherein detecting that the wearable mobile user device is within the communication range of the given secure computing device associated with the user comprises:
    detecting the given secure computing device is paired with the wearable mobile user device via Bluetooth.

6. The method of claim 1, wherein the one or more secure computing devices include at least a smart phone belonging to the user.

7. The method of claim 1, wherein the one or more computing devices include:
    one or more additional wearable mobile user devices belonging to one or more additional users, and/or one or more additional smart phones belonging to one or more of the additional users.

8. The method of claim 1, wherein the user interface of the wearable mobile user device that presents the output based on the voice message includes a plurality of interactive elements.

9. The method of claim 8, further comprising:
receiving a selection, by the user, of a first interactive element of the interactive elements, wherein the first interactive element is associated with the voice message, and
in response to receiving the selection of the first interactive element, providing the voice message received at the first time for audible presentation to the user.

10. The method of claim 8, further comprising:
receiving a selection, by the user, of a second interactive element of the interactive elements, wherein the second interactive element is associated with the transcription, and
in response to receiving the selection of the second interactive element, enabling editing of the transcription of the voice message.

11. The method of claim 8, further comprising:
receiving a selection, by the user, of a third interactive element of the interactive elements, wherein the third interactive element is associated with the action taken in response to the voice message, and
in response to receiving the selection of the third interactive element, providing, for presentation, one or more of:
a map that includes an indication of the location associated with the wearable mobile user device at or near the first time, and
an image that corresponds to the location associated with the wearable mobile user device at or near the first time.

12. The method of claim 1, wherein transmitting the set of data to the one or more servers via the network further causes the one or more servers to:
determine a confidence score associated with the transcription of the voice message received at the first time, and
based on the confidence score satisfying a threshold, perform the action based on the transcription.

13. The method of claim 1, wherein content of the voice message includes a reminder request or a memo request.

14. The method of claim 1, further comprising:
prior to receiving the voice message at the first time:
receiving, from the user, an indication to activate one or more input devices of the wearable mobile user device.

15. A system, comprising:
a wearable mobile user device, the wearable mobile user device having one or more processors, and memory storing instructions that, when executed, cause one or more of the processors of the wearable mobile user device to:
capture, at a microphone of the wearable mobile user device, a voice message provided by a user of the wearable mobile user device, the voice message provided by the user at a first time;
identify contextual data associated with one or more computing devices in proximity to the wearable mobile user device at or near the first time, wherein identifying the contextual data is based on one or more signals that are from the one or more computing devices and that are detected at the wearable mobile user device at or near the first time, and
wherein the contextual data is processable to determine a location associated with the wearable mobile user device at or near the first time;
in response to determining that the wearable mobile user device is outside of a communication range of one or more secure computing devices associated with the user:
store, in the memory of the wearable mobile user device, a set of data, the set of data including: audio data representing the voice message received at the first time, and the contextual data, wherein each of the one or more secure computing devices is authorized, by the user, to receive the voice message from the wearable mobile user device and to transmit the voice message to one or more servers; and
at a second time subsequent to the first time, and in response to detecting that the wearable mobile user device is within the communication range of a given secure computing device of the one or more secure computing devices associated with the user:
transmit the set of data to the given secure computing device;
the given secure computing device of the one or more secure computing devices, the given secure computing device having one or more processors, and memory storing instructions that, when executed, cause one or more of the processors of the given secure computing device to:
receive the set of data from the wearable mobile user device;
transmit, via a network, the set of data to the one or more servers, and wherein transmitting the set of data to the one or more servers via the network causes the one or more servers to:
determine, based on the contextual data, the location associated with the wearable mobile user device at or near the first time,
generate a transcription of the voice message received at the first time,
generate an indication of an action taken in response to the voice message and in view of the contextual data, and
provide, to the given secure computing device and from one or more of the servers via the network:
the location associated with the wearable mobile user device at or near the first time, the transcription of the voice message received at the first time, and the indication of the action taken in response to the voice message; and
transmit, to the wearable mobile user device and from the given secure computing device:
the location associated with the wearable mobile user device at or near the first time, the transcription of the voice message, and the indication of the action taken in response to the voice message; and
in response to the transmitting, to the wearable mobile user device and from the given secure computing device, the wearable mobile user device is further to:
automatically provide, for presentation to the user via a user interface of the wearable mobile user device, output based on the voice message, the output including at least the location associated with the wearable mobile user device at or near the first time, the transcription of the voice message, and the indication of the action taken in response to the voice message.

16. The system of claim 15, wherein the contextual data includes:
an identifier associated with a given computing device, of the one or more computing devices, in proximity to the wearable mobile user device at or near the first time, and/or
a signal strength associated with a given signal of the one or more signals that are from the one or more computing devices and that are detected at the wearable mobile user device at or near the first time.

17. The system of claim 16, wherein the one or more servers, in determining, based on the contextual data, the location associated with the wearable mobile user device at or near the first time, are to:
process the identifier and the signal strength to determine the location associated with the wearable mobile user device at or near the first time.

18. The system of claim 15, wherein the set of data stored in the memory of the wearable mobile user device further includes a timestamp corresponding to the first time.

19. The system of claim 15, wherein the user interface of the wearable mobile user device that presents the output based on the voice message includes a plurality of interactive elements that, in response to receiving a selection of one of the plurality of interactive elements, causes the wearable mobile user device to provide:
the voice message received at the first time for audible presentation to the user,
the transcription of the voice message for editing by the user,
a map that includes an indication of the location associated with the wearable mobile user device at or near the first time,
an image that corresponds to the location associated with the wearable mobile user device at or near the first time, or
information that is associated with the location associated with the wearable mobile user device at or near the first time.

20. A wearable mobile user device, comprising:
a display device;
a microphone
one or more processors; and
memory storing instructions that, when executed, cause one or more of the processors to:
capture, at the microphone of the wearable mobile user device, a voice message provided by a user of the wearable mobile user device, the voice message provided by the user at a first time;
identify contextual data associated with one or more computing devices in proximity to the wearable mobile user device at or near the first time,
wherein identifying the contextual data is based on one or more signals that are from the one or more computing devices and that are detected at the wearable mobile user device at or near the first time, and
wherein the contextual data is processable to determine a location associated with the wearable mobile user device at or near the first time;
in response to determining that the wearable mobile user device is outside of a communication range of one or more secure computing devices associated with the user:
store, in the memory of the wearable mobile user device, a set of data, the set of data including: audio data representing the voice message received at the first time, and the contextual data,
wherein each of the one or more secure computing devices is authorized, by the user, to receive the voice message from the wearable mobile user device and to transmit the voice message to one or more servers;
at a second time subsequent to the first time, and in response to detecting that the wearable mobile user device is within the communication range of a given secure computing device of the one or more secure computing devices associated with the user:
transmit the set of data to the given secure computing device, wherein transmitting the set of data to the given secure computing device causes the given secure computing device to transmit, via a network, the set of data to the one or more servers, and wherein transmitting the set of data to the one or more servers via the network causes the one or more servers to:
determine, based on the contextual data, the location associated with the wearable mobile user device at or near the first time,
generate a transcription of the voice message received at the first time,
generate an indication of an action taken in response to the voice message and in view of the contextual data, and
provide, to the given secure computing device and from one or more of the servers via the network: the location associated with the wearable mobile user device at or near the first time, the transcription of the voice message received at the first time, and the indication of the action taken in response to the voice message; and
receive, at the wearable mobile user device and from the given secure computing device:
the location associated with the wearable mobile user device at or near the first time, the transcription of the voice message, and the indication of the action taken in response to the voice message; and
automatically provide, for presentation to the user via the display device of the wearable mobile user device, output based on the voice message, the output including at least the location associated with the wearable mobile user device at or near the first time, the transcription of the voice message, and the indication of the action taken in response to the voice message.

* * * * *